United States Patent [19]

Hoech

[11] Patent Number: 5,065,017

[45] Date of Patent: Nov. 12, 1991

[54] ZERO MARK FOR OPTICAL ENCODER USING STATOR MASK PATTERNS AND ROTOR PATTERNS

[76] Inventor: Robert W. Hoech, 7150 Chelsea Dr. NE., Cedar Rapids, Iowa 53402

[21] Appl. No.: 511,699

[22] Filed: Apr. 20, 1990

[51] Int. Cl.5 .............................................. G01D 5/34
[52] U.S. Cl. ........................... 250/231.17; 250/237 G; 356/395
[58] Field of Search ...................... 250/231.17, 237 G; 356/395; 33/707; 341/13

[56] References Cited

U.S. PATENT DOCUMENTS

| | | |
|---|---|---|
| 3,187,187 | 6/1965 | Wingate . |
| 3,671,755 | 6/1972 | Horius ................................. 356/395 |
| 3,749,925 | 7/1973 | Hertrich . |
| 3,995,156 | 11/1976 | Angersbach et al. ................ 356/395 |
| 4,263,506 | 4/1981 | Epstein . |
| 4,451,731 | 5/1984 | Leonard . |
| 4,602,155 | 7/1986 | LaPlante . |
| 4,670,737 | 6/1987 | Rilling . |
| 4,678,908 | 7/1987 | LaPlante . |
| 4,717,824 | 1/1988 | Sakamoto et al. . |
| 4,736,187 | 4/1988 | Kibrick et al. . |
| 4,900,924 | 2/1990 | Masuda et al. .................. 250/231.17 |

FOREIGN PATENT DOCUMENTS 3536466A 4/1987 Fed. Rep. of Germany .
60-161521A 8/1985 Japan .

Primary Examiner—David C. Nelms
Assistant Examiner—Que T. Le

[57] ABSTRACT

An incremental position encoder makes use of a first and second track of non-identical non-complementary aperiodic patterns to generate a zero mark. A mask with the identical pattern to the first track and a mask with the complementary pattern to the second track correlate with the patterns on the first and second track when the encoder is in zero position. Light transmitted by the masks produce electrical signals that are compared to create the zero mark. An iterative approach improves the discrimination of an initially selected track pattern for its particular application based on developed criteria for good noise immunity and resoltuion. The size of the reference track with respect to the increment track and the placement of each mask on the stator and rotor are optimized. A system for improving noise immunity by biasing the signal from each photodetector is also shown.

18 Claims, 6 Drawing Sheets

FIXED DENSITY OPTIMIZATION

ZERO MARK FOR OPTICAL ENCODER USING STATOR MASK PATTERNS AND ROTOR PATTERNS

BACKGROUND OF THE INVENTION

1. Field of the Invention

The present invention concerns position encoders and in particular incremental encoders having a zero mark signal.

2. Background Art

Position encoders ("encoders") are electro-mechanical devices producing a digital output related to the position of a movable element of the encoder. In one such encoder design, a rotary encoder, the movable element is a rotatable shaft. The rotatable shaft is attached to a disk shaped rotor having an optically readable pattern marked on its surface. The pattern may be formed by alternating opaque and transmissive frames. The frames are illuminated from one side by a illumination source and light travels from the illumination source through the opaque and transmissive frames of the rotor and similar frames in a stationary stator mask. The light transmitted by the stationary mask is detected by a stationary photodetector. Rotation of the shaft moves the rotor which in turn causes a fluctuation in the transmitted light producing a signal that may be decoded into a digital indication of shaft movement.

Encoders may be classified as absolute encoders or incremental encoders. Absolute encoders produce a unique digital code word for each encoder position. The rotor of an absolute encoder may carry a multi-bit Grey code, for example, where each bit is read by a separate photodetector to produce the output digital word.

Incremental encoders provide only an indication of the change in position. The rotor of an incremental encoder ordinarily contains a uniform periodic pattern whose movement past a photodetector creates an increment signal indicative the amount that the shaft has rotated. Two or more photodetectors arranged with an offset of 90° ("quadrature") may be used to provide an indication of the direction as well as amount of rotation of the shaft, as is understood in the art.

Frequently, a zero mark track is included on the rotor of an incremental encoder. The zero mark track provides a reference signal that indicates that the encoder shaft is at a "zero" position. This zero mark signal typically resets a counter that counts up or down with the increment signals from the encoder. The value of the counter thereby provides a running indication of the absolute encoder position.

The zero mark signal may be generated by the alignment of a single transmissive frame of the rotor with a corresponding frame in the stationary mask ("stator mask⇌") to allow light from an opposed source of illumination to strike the surface of a photodetector. The position of this alignment is defined to be the zero position for the encoder.

The drawback to the use of a single transmissive frame for generating the zero mark signal is that, as the resolution of the encoder increases, the size of the single frame becomes increasingly small. A reduction in area of the transmissive frame decreases the light detected by the photodetector causing a decrease in the signal-to-noise ratio ("SNR") of the zero mark signal.

Two approaches have developed to counteract the decreasing SNR of the zero mark signal with increasing encoder resolution. In one approach, miniature lenses are used to concentrate the light transmitted by the single transmissive frame more efficiently on the photodetector. Alternatively, multiple, staggered transmissive frames have been used to generate the zero mark signal. Together, the area of the staggered frames is large, improving the zero mark SNR, and yet the area of each frame is small preserving the resolution of the zero mark signal. At the zero position of the encoder, the staggered frames on the rotor match corresponding frames on the stator mask to transmit light. Careful choice of the frame spacing can be used to minimize the transmitted light at the non-zero positions of the encoder.

This technique is described in U.S. Pat. No. 3,187,187 to Wingate and entitled "Photoelectric Shaft Encoder". Wingate describes several patterns of transmissive elements used to produce a zero mark signal. The patterns are derived from short arithmetic progressions that reduce the matching of transmissive segments of the rotor and stator mask for nonzero encoder positions.

Similar patterns of greater length, also based on arithmetic progressions, are taught by LaPlante in U.S. Pat. Nos. 4,602,155 and 4,678,908.

These techniques for generating the rotor and stator patterns are cumbersome for use in high resolution encoders where long zero mark patterns are desired. Further, such arithmetic progressions may produce zero mark signals with substantially less than optimum noise immunity.

SUMMARY OF THE INVENTION

In one embodiment of the present invention, a high resolution zero mark signal is generated using two rotor tracks with non-identical and non-complementary aperiodic patterns. Transmissivity signals indicating the alignment between these patterns and corresponding stator mask patterns are compared to provide an indication of the zero position of the encoder.

It is one object of the invention, therefore, to improve the noise immunity of the zero mark signal. As will be described below, the use of two different aperiodic patterns increases the separation between the transmissivity signals providing increased margin against noise induced errors in the comparison of these signals.

It has been determined that two variables defined herein and designated the "zero mark discrimination" and the "secondary maximum", successfully measure the desirable characteristics of an aperiodic zero mark pattern. Accordingly, the patterns for the zero mark signals are optimized for zero mark discrimination and secondary maximum. An iterative process is employed to examine variations of input pattern and to select a variation with improved zero mark discrimination. Similar technique permits the secondary maximum to be minimized or maximized for a given or better zero mark discrimination.

It is thus a further object of the invention to provide a simple and computationally efficient method of producing zero mark patterns of arbitrary length with good noise immunity characteristics. By identifying a means of evaluating zero mark patterns, the iterative process described may be applied to a randomly selected pattern of the desired length.

In yet another embodiment of the invention, a bias means is provided to impart a constant bias to one of two transmissivity signals prior to their comparison.

The bias amount may be adjusted to equalize the separation of the two transmissivity signals at the zero encoder position versus the minimum separation of the two signals for non-zero encoder positions or to increase preferentially the separation of the transmissivity signals for non-zero encoder positions.

It is therefore a further object of the invention to provide a means for adjusting the extremes of two transmissivity signals about a threshold level to provide for improved noise immunity.

In a further embodiment of the invention, an increment signal produced by an increment pattern on the rotor is logically ANDed with at least one transmissivity signal to produce the zero mark signal. The frames size of the pattern generating the zero mark signal is adjusted to be 3/2 that of the frame size of the increment track. As will be described in additional detail below, this adjustment further increases the noise immunity of the zero mark signal near the zero encoder position.

It is therefore yet another object of the invention to improve noise immunity by the proper selection of the relative frame sizes of the zero mark and increment patterns.

Other objects and advantages will be apparent to those experienced in the art from the description of a preferred embodiment of the invention which follows. In the description, reference is made to the accompanying drawings, which form a part hereof, and which illustrate one example of the invention. Such example, however, is not exhaustive of the various alternative forms of the invention, and therefore reference is made to the claims which follow the description for determining the scope of the invention.

DETAILED DESCRIPTION OF THE PREFERRED EMBODIMENT

Figure 1:
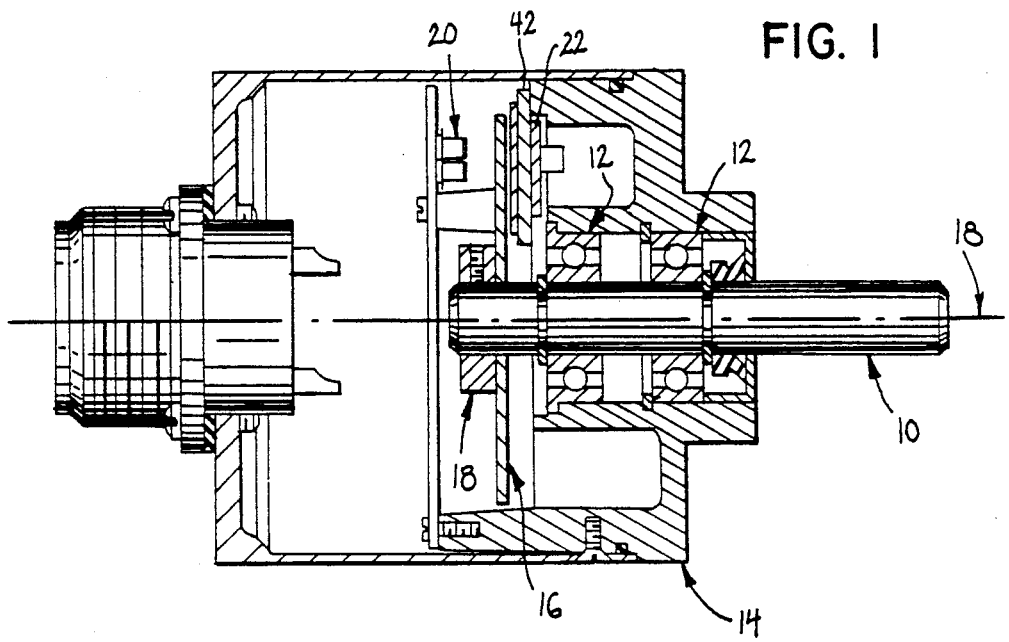
FIG. 1 is a sectional view of a rotary position encoder suitable for use with the present invention, showing the relative position of the rotor and stator mask and the photodetecting elements.

Referring to FIG. 1, a rotary shaft encoder suitable for use with the present invention includes a 0.375" diameter stainless steel input shaft 10 axially aligned by means of stainless steel-ball bearings 12. The ball bearings 12 are chosen for continuous operation at 3000 rpm with an applied radial load of 40 lbs and an axial load of 20 lbs and the outer races of the ball bearings 12 are supported by a cast zinc/aluminum housing 14.

Figure 4:
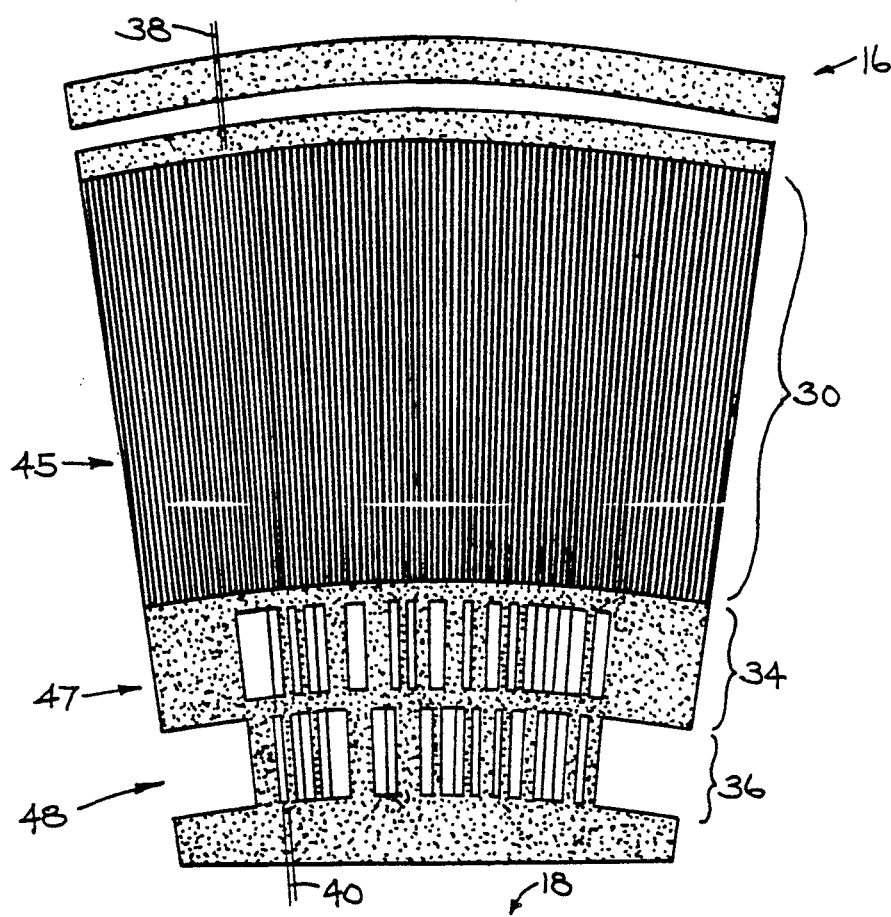
FIG. 4 is an enlarged detail in plan view of a section of the rotor of FIG. 1.

A disk-shaped rotor 16 is attached to one end of the shaft 10 by means of hub 18 so as to rotate with rotation of the shaft 10 about a center axis 18 perpendicular to the face of the disk of rotor 16. Referring to FIG. 4, the face of rotor 16 holds three tracks 30-36 of optically readable patterns 45-48 arranged at various radii about the rotor's axis of rotation 18. In one embodiment, the rotor disk 16 may be made from a 0.002" thick stainless steel plate and the patterns formed of light-transmissive areas chemically etched through its surface and light opaque areas where the stainless steel is not removed. Alternatively, the rotor disk 16 may be a metalized borosilicate glass plate with the patterns of transmissive area 28 and opaque areas 26 applied by a photographic process, as is known in the art.

Referring again to FIGS. 1 and 4, positioned along one face of the rotor 16 are a set of infrared, light emitting diodes ("LED's") 20. The LED's 20 oppose a receiving array LED's 20 is transmitted through the transmissive areas of tracks 30-36 of the rotor disk 16, through a stationary mask 42, to be described, to the photodiodes 22.

Referring to FIG. 4, the three tracks 30-36 of the rotor disk 16 describe concentric circles of successively increasing radii on the surface of the rotor disk 16. The circles of the tracks are centered on axis of rotation 18. The first track 30 in order of decreasing radius is termed the "increment track", and the second and third tracks, 34, and 36, also in order of decreasing radius, are termed "zero mark tracks".

INCREMENT TRACKS

The increment track 30 defines the boundary of rotor increment pattern 45 consisting of a series of frames 38 of uniform dimension that are alternately opaque and transmissive. The "width" or angle of each frame 38, measured along the circumference of the rotor disk 16, is equal to 2A where A is twice the fundamental resolution of the encoder. The state of each frame 38 may be represented by a binary digit: "0" if the frame is the opaque and "1" if the frame is transmissive.

As shown in FIG. 1, light from the LED's 20 is transmitted through the transparent frames 38 of the rotor increment pattern 45, next passing through a stationary stator mask 42 having four stator patterns 44 (not shown in FIG. 1).

Figure 3:
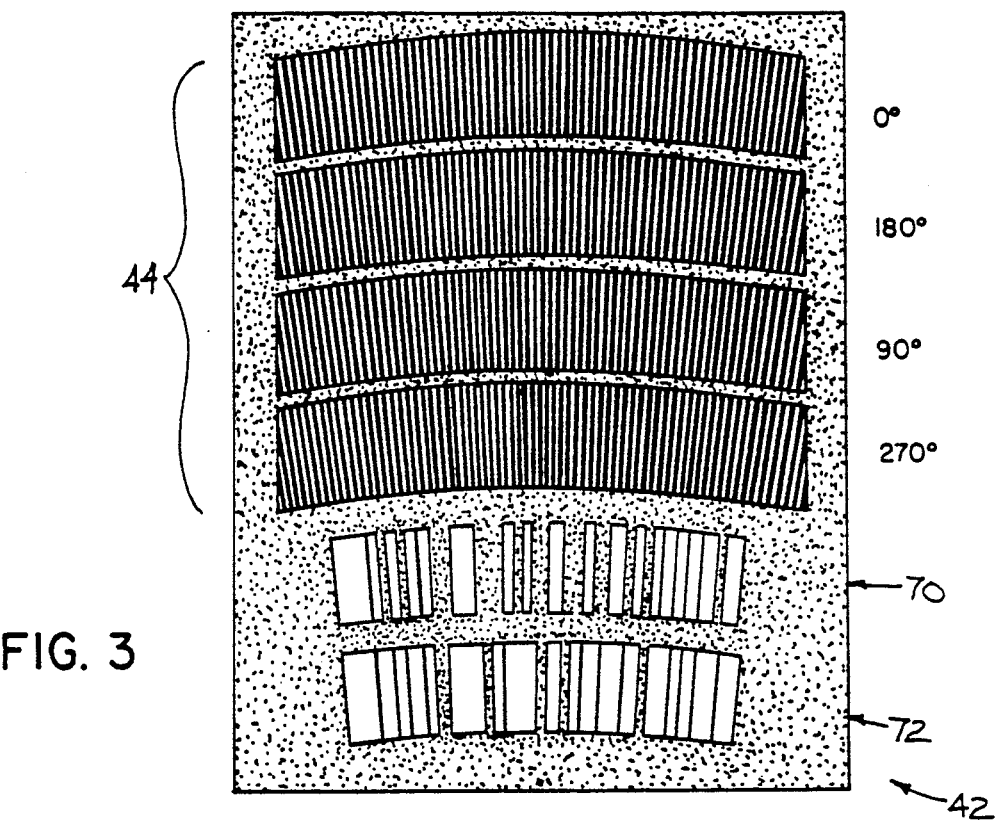
FIG. 3 is plan view of the stator mask of FIG. 1.

Referring to FIG. 3, the stator patterns 44 are comprised of an alternating series of opaque and transmissive frames similar in width to those of the rotor increment pattern 45 on the rotor disk 16. These stator patterns 44 serve to block or transmit light exiting the rotor increment pattern 45 as the rotor disk 16 turns on shaft 10. The effect of the combined rotor increment pattern 45 and a corresponding stator patterns 44 is that the intensity of the transmitted light to the photodiodes 22 associated with each stator pattern 44 varies cyclically every 4A degrees of shaft rotation.

Each of the four stator patterns 44 has a different relative angular offset around axis 18 to allow the maximum transmission of light through the rotor increment pattern 45 and the corresponding stator pattern 44 to occur at a different phase in the cyclic variation of the transmitted light. The signals produced by the photodiodes 22 associated with each of the mask patterns 44 will be therefore identified by its relative phase of 0°, 180°, 90° or 270°. The masks 44 together with the associated LED's 20 and the photodiodes 22 will be termed collectively the "quadrature sensors".

Figure 2:
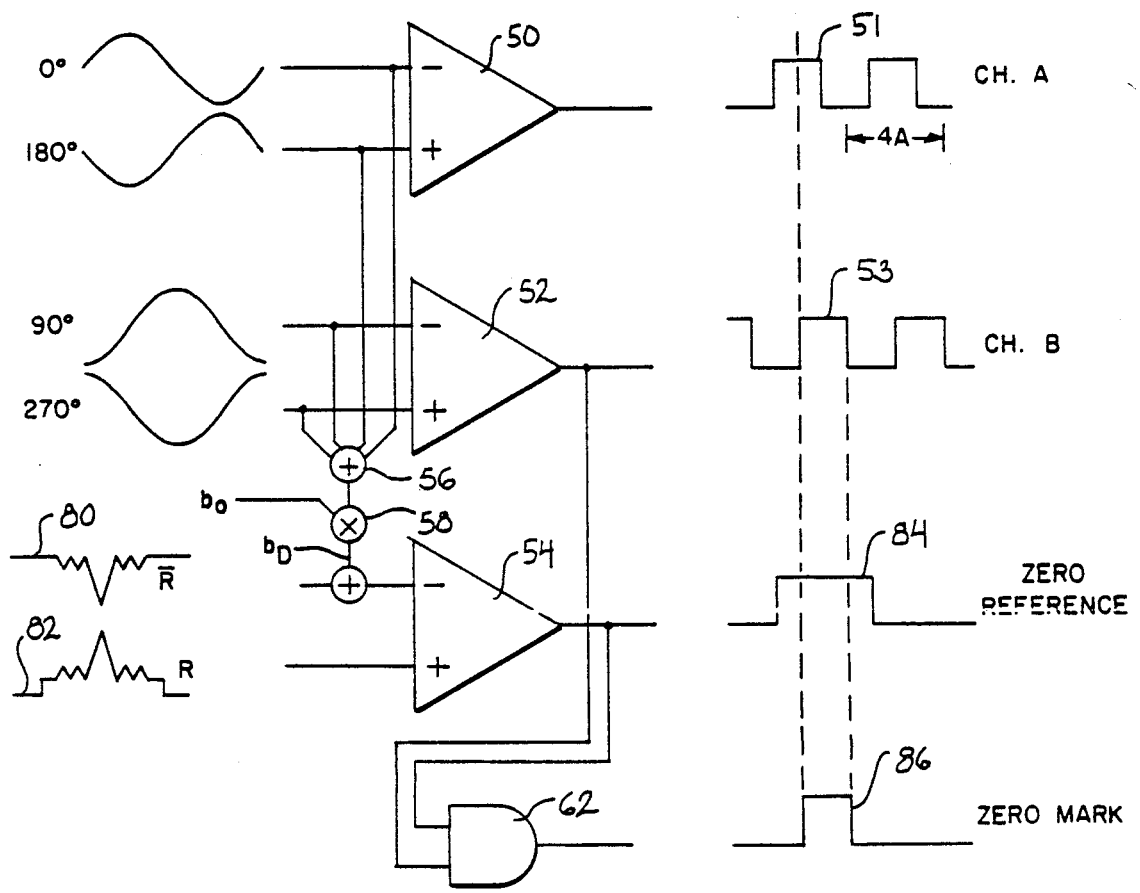
FIG. 2 is schematic view of a circuit for processing the increment and zero mark signals produced by the photodetecting elements of the encoder of FIG. 1.

Referring to FIG. 2, the 0° and 180° signals are received by a comparator 50 to produce a digital squarewave signal with a period of 4A and designated "Channel A". The 90° and 270° signals are received by a comparator 52 to produce a second digital square-wave signal also with a period of 4A but with phase lag of 90° with respect to the signal of Channel A. This signal is designated "Channel B".

Together, the signals from Channel A and B provide information as to the direction of rotation and amount of rotation of the shaft 10 as is understood in the art.

ZERO MARK TRACKS

Referring again to FIG. 4, the second and third tracks of the rotor disk 16, in order of decreasing radius, are zero mark tracks 34 and 36. The zero mark tracks 34 and 36 hold zero mark patterns 47 and 48 respectively which consist of a pattern of frames 40 each of uniform dimension. Unlike the frames 38 of the increment rotor pattern 45, the frames 40 of the zero mark patterns 47 and 48 are aperiodically opaque and transmissive. The size of a frame 40 is understood to be the highest spatial frequency component of the pattern 47 and 48. The "width" or angle along the circumference of the rotor disk 16 subtended by each frame 40 is equal to 3A rather than 2A as with frames 38 of the increment pattern 45.

Again, the state of each frame 44 may be represented by a binary digit: "0" if the frame is the opaque and "1" if the frame is transmissive. The pattern of the opaque and transmissive frames 40 of the zero mark tracks 34 and 36 will be described in detail below.

Referring again to FIG. 1, light from the LED's 20 passes through the zero mark rotor tracks 34 and 36 as shown in FIG. 4, and then passes through corresponding patterns 70 and 72 on stator mask 42 as shown in FIG. 3.

Each pattern 70 and 72 is comprised of transmissive and opaque frames. Light is transmitted only through the transmissive frames of the rotor patterns 34 and 36 that are aligned as a result of shaft 10 position with transmissive frames of the stator patterns 70 and 72. The rotor pattern 47 is identical to the stator pattern 70 but the rotor pattern 48 is the complement to the stator pattern 72. That is, for each "1" frame of the stator pattern 72, the corresponding frame of the rotor pattern 48 is a "0" and for each "0" frame of the stator pattern 72, the corresponding frame of the rotor pattern 48 is a "1".

Accordingly, at a certain shaft 10 position, defined to be angle $\phi=0$, the state of each frame of stator pattern 70 is equal to the state of frame of rotor pattern 47 aligned with the frame of stator pattern 70. That is, the patterns are aligned in an identical relationship. Conversely, at the same shaft 10 position of $\phi=0$, the state of each frame of aligned frame of rotor pattern 48, that is, the patterns are aligned in a complementary relationship. The condition of alignment where the patterns have an identical or complementary relationship will be termed "matching".

The stator and rotor patterns 70 and 47 that align in an identical relationship at $\phi=0$ together with their associated LED's 20 and photodiodes 12 will be termed the "maximally transmissive sensor". And the stator and rotor patterns 72 and 48 that align in a complementary relationship at $\phi=0$ together with their associated LED's 20 and photodiodes 12 will be termed the "minimally transmissive sensor".

The rotor and stator patterns 72 and 48 and the photodiodes 22 associated therewith together produce the "complementary" signal 80 whereas the rotor and stator patterns 70 and 47 and the photodiodes 22 associated therewith produce the "non-complementary" signal 82. Referring to FIG. 2, the complementary and non-complementary signals 80 and 82 are combined by comparator 54 to produce a digital zero reference signal 84 that is "true"for values of $\phi$ near 0. This zero reference signal 82 is combined by AND gate 62 with the Channel B signal 53 to form a zero mark signal 86. In one embodiment, as shown in FIG. 2, the non-complementary signal 82 may be biased by a signal $b_0$ to be described further below.

The stator mask patterns 72 and 70 are of identical length to the rotor patterns 48 and 47. The angular length of the rotor and stator patterns is 9.5° and is a function of the usable area of the photodiodes.

Figure 5:
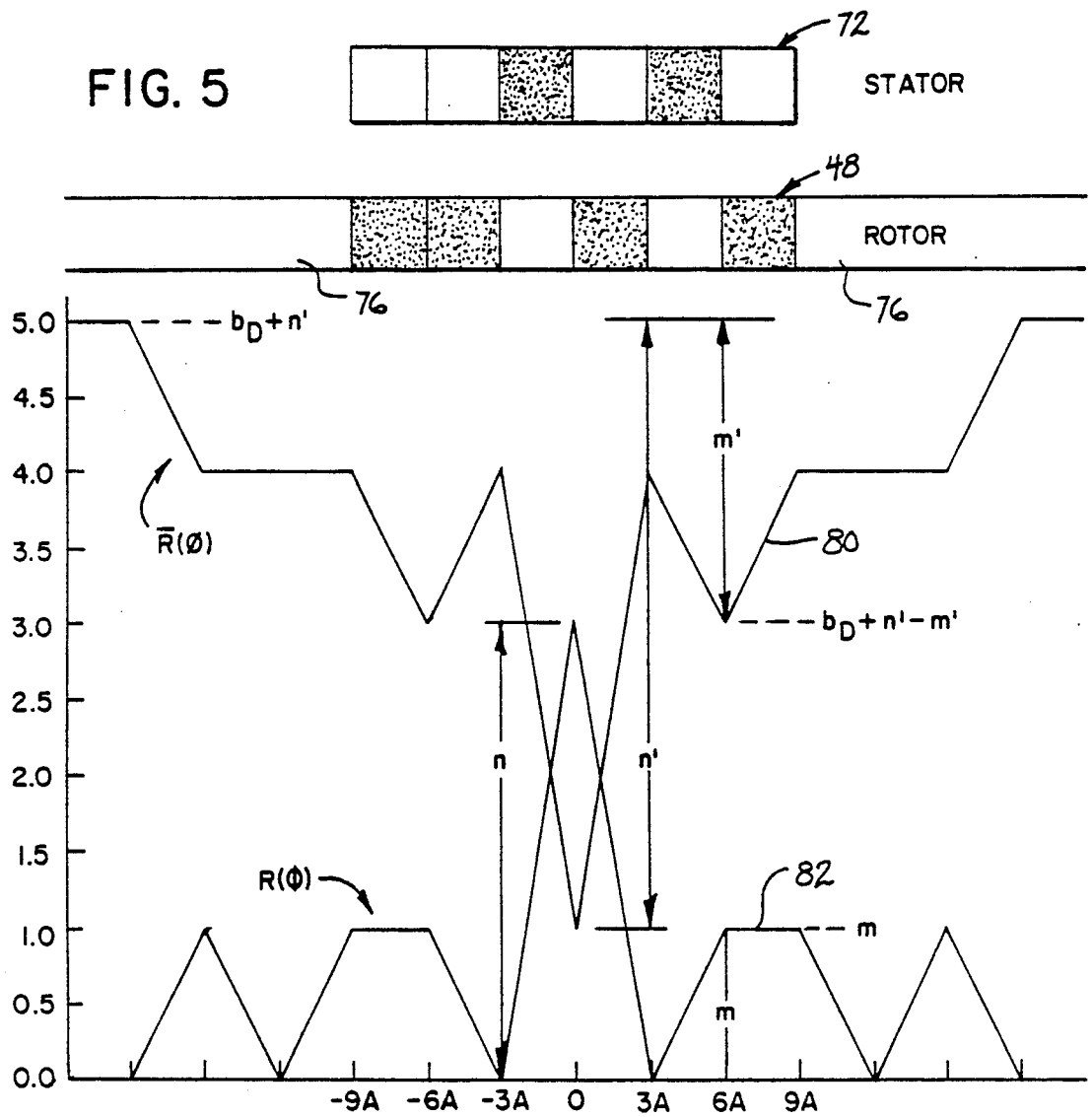
FIG. 5 is diagram of a simplified embodiment of rotor and stator patterns having non-transmissive frames indicated by a shaded pattern and showing the transmissivity functions for each and defining variables with respect to those transmissivity functions.

FIG. 5 depicts the complementary sensor signal 80 and the non-complementary sensor signal 82 of a simplified embodiment of the invention. This embodiment uses stator patterns 72 and 70 and rotor patterns 48 and 47 having a length "L" of six frames (18A). The value of the non-complementary signal 82 is proportional to the amount of light transmitted by the non-complementary stator and rotor patterns 70 and 47 as a function of shaft 10 position $\phi$. This transmissivity is measured by the transmissivity function $R(\phi)$ which $R(\phi)$ is a continuous triangular function whose vertices occur at multiples of the trame size $\phi=i\cdot 3A$ for integers i according to the following equation:

$$R(\Phi) = \sum_{k=1}^{L-\Phi} c_k \cdot c_{k+\Phi} \tag{1}$$

(1)

where L is the length (6) of the pattern in frames as described above and $c_k$ is the kth element of the pattern [0,1,0,1,1,0], and $\Phi$ is the discrete representation of the continuous variable $\phi$, having values only at $i\cdot 3A$ for integers i. It will be apparent from the following discussion that the frame size need not be 3A but may be varied according to criteria given below.

$R(\Phi)$ has its maximum vauue, corresponding to the maximum transmission of light by the non-complementary sensor at $\phi= =0$. This maximum value equals "n" where "n" is termed the primary maximum and is equal to the number of 1's or transmissive frames in the pattern 70. The minimum transmission of light will occur when the stator pattern 70 and the rotor pattern 47 do not overlap at all and the stator pattern 70 is aligned with the opaque margin 74, beyond the rotor pattern 47 for $31 L > \phi > L$, and is equal to 0. A third value designated "m", is the "secondary maximum" of $R(\Phi)$ and is equal to the maximum value of $R(\Phi)$ over the "non-zero region" of $R(\Phi)$ outside of the interval $3A > \Phi 22 -3A$.

The value of the complementary signal 80 is proportional to the amount of light transmitted by the complementary stator and rotor patterns 72 and 48 as a function of shaft 10 position $\phi$. This complementary transmissivity is designated $\overline{R}(\phi)$ and is a continuous triangular function whose vertices occur at $\phi=i\cdot 3A$ for integers i according to the following equations:

$$e,ovs/R/\ (\Phi)=(n'-R'(\Phi))+b_D \quad (2)$$

where $$R'(\Phi) = \sum_{k=1}^{L-\Phi} c'_k \cdot c'_{k-\Phi} \quad (3)$$

where again, L is the length of the pattern in frames as described above and $c'k$ is the kth element of the zero mark pattern [0,0,1,0,1.0] and $\Phi$ is the discrete representation of the continuous variable $\phi$, having values only at $i\cdot 3A$ for integers i and $b_D$ is a bias provided by tne sensor circuitry and to be discussed further below.

The maximum transmission of light will be when the stator pattern 72 and the rotor pattern 48 do not overlap at all and the stator pattern 70 is aligned with the transparent margin 76 beyond the disk pattern. The value of $\overline{R}(\Phi)$ in this region is equal to the number of 1's or transmissive frames in the pattern 72 (designated n') plus tne bias amount $b_D$. The minimum transmission of light by the stator pattern 72 and rotor pattern 48 will be at $\phi=\Phi=0$ and is termed the primary minimum and is n' below the maximum of $n'+b_D$ as described above. A third value, designated the secondary minimum is the minimum of $\overline{R}(\Phi)$ for a region $-3A<\phi<3A$, the non-zero region. The secondary minimum is m' below the maximum of $n'+]b_D$ as described above.

Producing a Zero Mark Pattern

The difference between "n" and "m" (or n' and m') will be termed the zero mark discrimination ("ZMD") and has been determined to provide a measure of accuracy and noise immunity of the zero mark pattern. The reason for this may be understood intuitively. Larger values of n-m provide a greater margin on either side of the comparison threshold used to produce the zero reference signal. In addition, larger values of n-m produce steeper rise rates in the complementary and non-complementary signals 80 and 82 near $\phi=0$ and hence more accurate zero reference positioning with respect to $\phi$.

As a secondary consideration, for patterns 70 and 47, it has also been determined that lower values of m will improve the immunity of the zero mark pattern to variations in the gain of the signal chain from the photodiodes to the comparator 54. Accordingly, m should be maximized while not decreasing ZMD.

Similarly, for patterns 72 and 48, it has been determined that larger values of n' improve the zero mark detector immunity to noise and signal bias in the signal chain from the photodiodes 22 to the comparator 54. Accordingly, for a given or better ZMD, n' should be maximized while not decreasing ZMD.

The selection of a zero mark pattern is made in accordance with these identified criteria. An operand pattern is first chosen by using a pseudorandom sequence truncated to the desired length, although other initial patterns may be used subject to the criterion given below. This operand pattern is then converted to a zero mark pattern as will be described to produce an "optimized binary aperiodic pattern".

It has been determined that the initial operand pattern preferably should have approximately an equal number of "1" and "0"'s, i.e., equal numbers of transmissive and non-transmissive frames for the subsequent optimization process. This proportion of transmissive frames to the total number of frames will be termed "density".

In the preferred embodiment for an encoder with increment track resolution A $=0.025°$, a length 126 is desired. Using the preferred zero mark frame width of 3A $=0.075°$, a zero mark pattern of length 126 spans 9.45° of the usable area of the photodiode array 22, i.e., a length of 127 would exceed the usable area of the photodiode array 22.

To achieve a pattern of this length with approximately equal numbers of transmissive and non-transmissive frames, a 127 frame maximal length binary sequence is generated using commonly understood techniques for generating pseudorandom sequences. The length of the this sequence is truncated to length 126 at some arbitrary point. The resulting pattern is the initial operand pattern, subsequently to be optimized for use as a zero mark pattern via methods to be described below. Other coefficients, pattern lengths, and amounts of truncation may be used to obtain an initial operand pattern of the desired length as will be understood to those of ordinary skill in the art. In general, the length of the pattern is determined by the physical dimensions of the encoder, the area of the photodiodes 22, and the desired degree of increment signal resolution.

Figure 6:
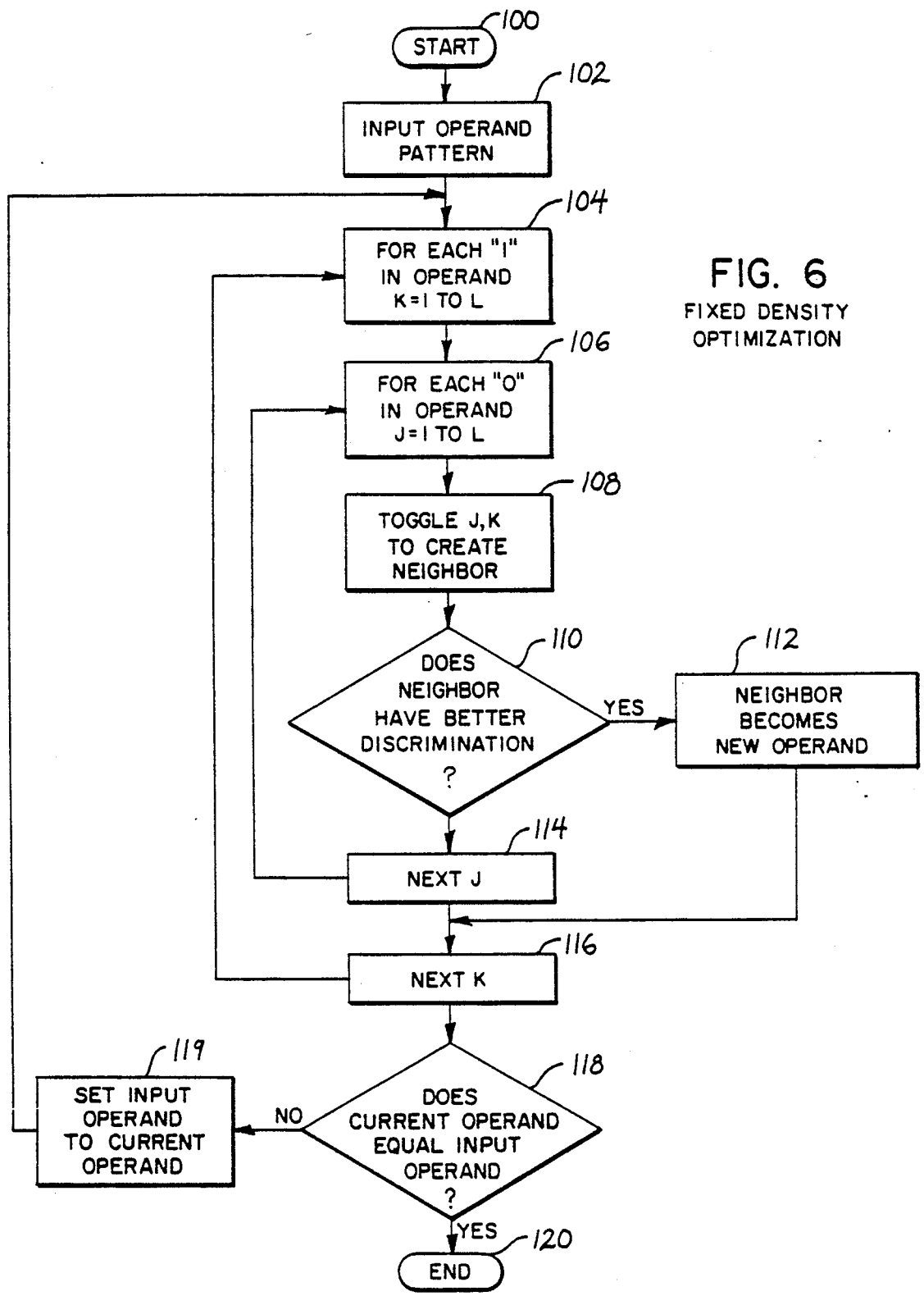
FIG. 6 is a flow chart showing a constant density optimization program for use in creating the zero mark patterns used in the encoder of FIG. 1.

Referring to FIG. 6, this initial operand pattern is optimized to improve its ZMD without changing the total number of transmissive cells "n" by means of a constant density optimization program (CD).

At process block 102, the truncated pseudorandom sequence is input as the operand pattern, termed the "input operand". Constant density "neighbors" of this pattern are examined in inner and outer loops formed by process blocks 104 and 116, and process blocks 106 and 114. A constant density neighbor is formed by successively identifying each "1" and "0" pair in the operand pattern and toggling them per process block 108. The toggling process simply changes the "1" to a "0" and vice versa to create a neighbor with the same number of 1's and 0's as the operand, hence a "constant density" neighbor.

The ZMD of each constant density neighbor so identified is compared to the ZMD of the current operand in decision block 110. The ZMD is determined by computing the function $R(\phi)$ for the operand sequence and the neighbor sequence and evaluating $ZMD=n-m$ for each sequence.

If the constant density neighbor has a better ZMD than the operand, the neighbor pattern becomes the current operand, as distinguished from the input operand, per process block 112.

Each neighbor is examined per the inner and outer loop of blocks 106 and 114, and 104 and 116, until all subsequent neighbors, per these loops, have been compared against the current operand.

At decision block 118, if the current operand equals the input operand, that is, if no better constant density neighbor has been found during the review of all neighbors, the program exits at block 120. If an improved neighbor has been found, however, as indicated by the difference between the current operand and the input operand, the current operand becomes the input operand at process block 119 and the program returns to block 104 to repeat the inner and outer loop to investigate neighbors to the new input operand per those loops.

This procedure thereby improves the ZMD of the input operand without changing the density of the operand pattern. Although a exhaustive search of all combinations of the input operand is not performed, this approach is computationally more efficient and is believed to provide similar results to more extensive search procedures.

Figure 7:
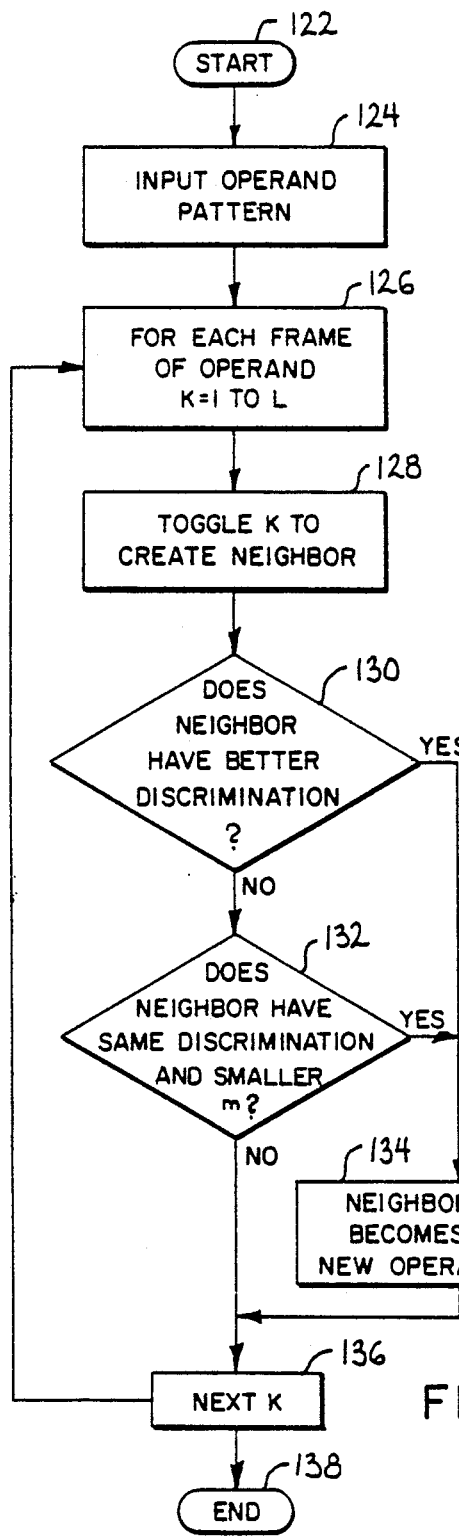
FIG. 7 is a flow chart showing a variable density optimization program for use in creating the noncomplementary patterns used in the encoder of FIG. 1.

Referring to FIG. 7, the current operand produced by the constant density optimization process (CD) at process block 120 may be next optimized for the non-complementary sensors via a variable density optimization process (VDNC). The current operand from the fixed density procedure is input as the input operand for the VDNC process per process block 124. Each frame of the current operand is addressed per the loop formed by process block 126 and 136, and toggled per process block 128 within that loop. Again, the toggling process converts a "1" to a "0" and vice versa. In this case, however, only one frame is toggled and hence the density of the neighbor produced is not equal to the input stator pattern 72 is the complement to the state of the operand. The "variable density" neighbor so produced is adopted as the current operand if it has better ZMD, per decision block 130, or if the frame toggled was originally a "1" and the ZMD is no worse than that of the current operand per decision block 132. The decision block 132 is logically equivalent to determining if the variable density neighbor has the same ZMD as the operand and a smaller m than the operand. This procedure serves to improve the ZMD further or to increase the overall opacity of the patter by decreasing m. As noted above, a decreasd in m reduces errors resulting from gain variations, bias, or noise in the photodetector signal chain.

As before, if the conditions of decision blocks 130 and 132 are not satisfied, the next variable density neighbors are examined per the loop of process block 126 and 136. When all the variable density neighbors have been examined, the program exits at 138.

The current operand upon exit 138 is adopted as the stator and mask pattern 70 and 47 for the non-complementary tracks.

Figure 8:
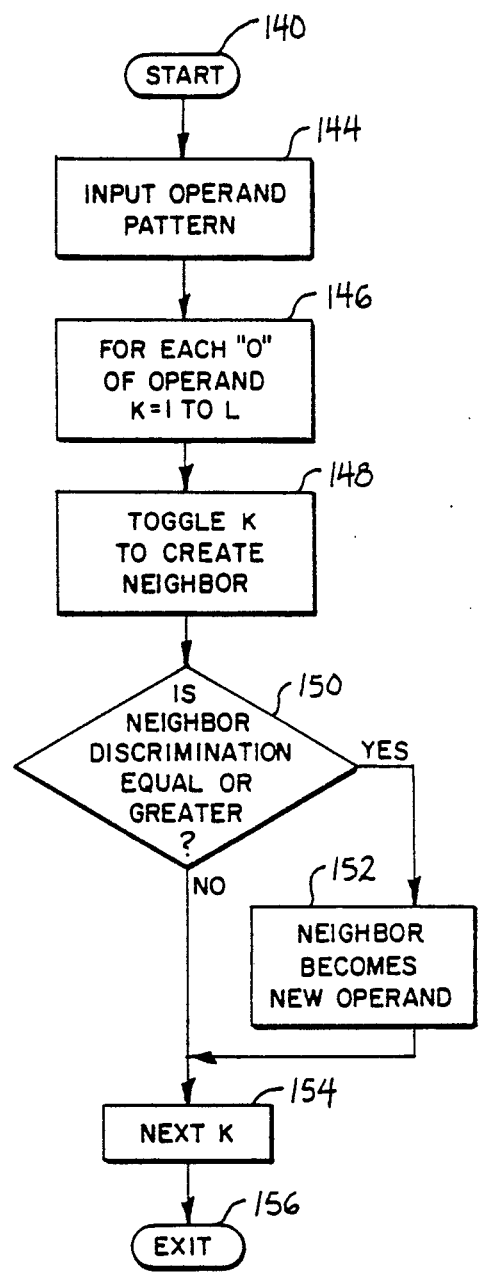
FIG. 8 is a flow chart showing a variable density optimization program for use in creating the complementary patterns used in the encoder of FIG. 1.

The stator and mask patterns 72 and 48 for the complementary tracks may be produced from the current operand developed during the constant density optimization program (CD) described above which is then input to a variable density complementary optimization procedure {VDC} at step 144 as shown in FIG. 8. Each frame of the current operand having a "0" is addressed per the loop formed by process block 146 and 154, and toggled per process block 148. The toggling process converts the "0" to a "1" as before. The variable density neighbor so produced is adopted as the current operand if it has a ZMD greater than or equal to that of the current operand. This procedure serves to improve the ZMD further or to increase the overall transmissivity of the pattern by increasing m'. For the complementary pattern an increase in m' reduces errors resulting from gain variations, bias, or noise in the photodiodes and subsequent circuitry.

If the condition of decision block 150 is not met, the next variable density neighbor is examined per the loop of process blocks 146 and 154. When all the variable density neighbors have been examined, the program exits at 156. The current operand upon exit is used for the rotor mask 47 and the complement of this pattern is used for the stator mask 72 for reasons that will be described further below.

As will be apparent from this discussion, each of these procedures improves the zero mark pattern and therefore with lesser effect, each may be used alone in an alternative embodiment from that described above. Alternatively, the procedures may be repeated using different pseudorandom sequences to further ensure the best zero mark pattern has been discovered.

Bias

Referring to FIGS. 2 and 5, a zero mark signal is generated at the point where the signal $\bar{R}(\phi)$ drops below $R(\phi)$ in the region $-A < \phi < A$, designated the "zero region". As in the discussion associated with FIG. 5, e,ovs/R/ ($\phi$) is the signal from the complementary sensor plus a bias signal $b_D$. The value where $\bar{R}(\phi)$ and $R(\phi)$ cross will be termed the "threshold level". The possibility of electrical or other noise causing a missed zero mark will depend principally on the degree of overlap of $\bar{R}(\phi)$ and $R(\phi)$ in the zero region. Conversely, the possibility of a false zero mark signal in the area $3A > \phi < -3A$, the "non-zero region", will depend principally on the difference between $\bar{R}(\phi)$ and $R(\phi)$ in this non-zero region. The minimum of $\bar{R}(\phi) - R(100)$ in this region is $n'-m'-m+b_D$, or the physical separation between the secondary minimums as shown in FIG. 5.

In general, immunity from false zero marks in the non-zero region is the more critical than immunity from missed zero marks in the zero region for two reasons: (1) the probability of false zero marks is more sensitive to gain variations in the signal chain from the photodiodes 22 than is the probability of missed zero marks. (2) the encoder has much longer exposure to noise induced false zero marks than it does to noise induced missed zero marks simply because the encoder position is non-zero much more often than it is zero.

For this reason, in one embodiment, the bias $b_D$ may be adjusted to make the minimum, in the non zero region, of $\bar{R}(\phi) - R(\phi)$ greater than or equal to $\bar{R}(0) - R(0)$. Referring to FIG. 2, the bias signal is added to the signal $R(\phi)$ by a summing junction 60 a is known in the art. In order that the bias signal follow the inherent bias level of the photodiodes 22, the bias is made proportional to a bias factor produced by summing the signals from each of the increment signals 0°, 180°, 90°, and 270° by summing junction 56 and scaling that signal with a bias constant $b_o$ through multiplier 58 to produce the bias $b_D$.

The Use of Different Zero Mark Patterns

It has been determined that the use of non-identical and non-complementary patterns improves the separation between the complementary and non-complementary signals 80 and 82. The sensitivity of $R(\phi)$ to variations in the gain of th signal chain from the photodiode is minimized by choosing $R(\phi)$ with minimum m (after maximizing ZMD). Separation between $\bar{R}(\phi)$ and $R(\phi)$ is maximized for the non zero region by choosing $R'(\phi)$ with a larger m'(or equivalently with a larger n' after ZMD is maximized). Hence optimum $R(100)$ differs from optimum $R'(100)$. Secondly, in rare cases, m and m' may occur at different values of $\phi$, improving signal separation in the non-zero region.

Optimal Frame Size

Figure 9:
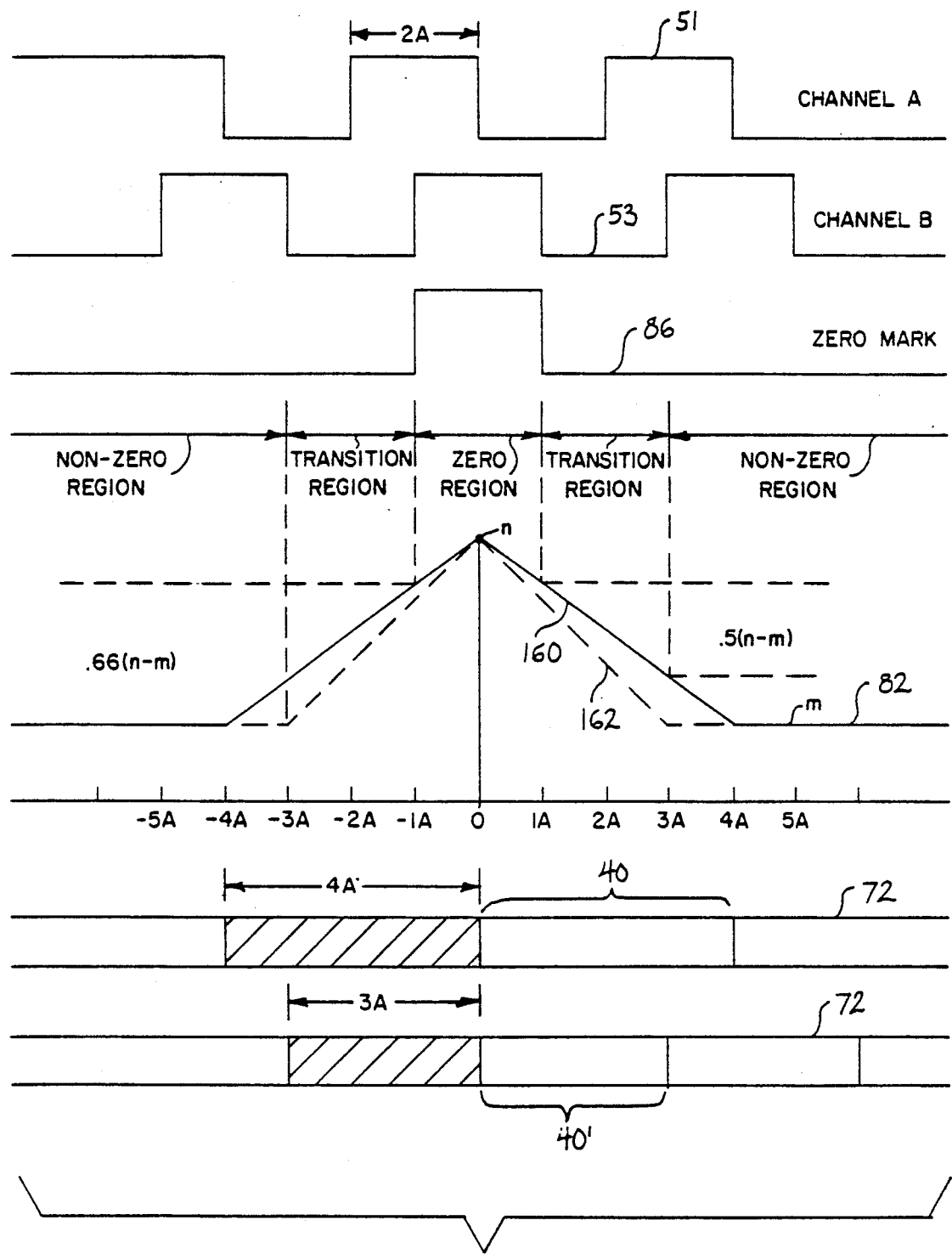
FIG. 9 is a graph showing the increment signals of the encoder of FIG. 1 and the relative size and placement of the transmissivity signal for two zero mark pattern frame dimensions.

Referring now to FIG. 9, the continuous transmissivity function R(100) near $\phi = 0$ forms an isosceles triangle 160 with apex at "n" rising from a base value of R($\phi$) at $|\phi| = 8A$ whose value depends on the particular pattern but is generally approximately equal to "m" for patterns with good ZMD. Referring also to FIG. 2, the zero mark signal is effectively enabled by channel B by virtue of AND gate 62 at values of $-A > \phi > +A$ termed the "zero region" and also at the intervals $-3A > \phi > -5A$ and $3A > \phi > +5A$, both "non-zero regions". Reliable triggering of the AND gate 62 at the zero region and not in the non-zero regions dictates that the value of R($\phi$) in the zero region be as large as possible with respect to the value of R($\phi$) in the non-zero regions. This difference is maximized if the isosceles triangle 160 of R($\phi$) is adjusted with respect to $\phi$, so that a possible secondary minimum value "m" at $|\phi| = 4A$ when the width of frame 40 equals 4A, is realized instead at $|\phi| = 3A$, the edge of the non-zero region, as is possible when the width of frame 40 equals 3A. This state, producing an R($\phi$) shown by triangle 162, is achieved generally when the frame size of the zero mark pattern 40 is set equal to 3/2 the frame size of the increment pattern 38. In one embodiment, therefore, the frames size of the zero mark track may be set to 3/2 times the frame size of the increment tracks.

Rotor and Stator Mask Selection

In an alternative embodiment, where a zero mark pattern and its complement are on the inner and outer track (as opposed to the above described embodiment where the inner and outer tracks have non-identical and non-complementary patterns), a choice arises as to whether the rotor patterns for the inner and outer tracks should be identical and one stator pattern should be complemented to form the minimally transmissive sensor (complemented stator), or whether the stator patterns on the inner and outer tracks should be identical and one rotor track should be complemented to form the minimally transmissive sensor (complemented rotor). Similarly, for the above described embodiment where the inner and outer codes are non-identical and non-complementary, the choice arises as to whether the complement of the optimized pattern for the minimally transmissive sensor should be placed on the stator 42 or on the rotor 16.

In both cases the rotor pattern is the pattern that is complemented. In the case of identical inner and outer codes, this choice provides a transmissivity function for the minimally transmissive sensor that is a constant plus the additive inverse of the transmissivity function of the maximally transmissive sensor. Complementing the stator 42 would not provide this relationship because the stator 42 is typically of limited angular extent as dictated by the size of the photodiode array 22. In the embodiment with non-identical and non-complementary inner and outer patterns, this choice provides a transmissivity function for the minimally transmissive sensor that is consistent with the pattern that has been optimized by the above described VDC procedure.

The above description has been that of a preferred embodiment of the present invention. It will occur to those who practice the art that many modifications may be made without departing from the spirit and scope of the invention. For example, the rotary encoder design described herein may be readily adapted to linear encoders using analogous increment tracks and zero marks signals. Thus the terms rotor 16 and stator 42 should be considered to cover two elements of a general position encoder having relative movement between the elements where the movement of the elements is the object of measurement. It should be apparent, also, to one of ordinary skill in the art, that the rotor and stator masks need not be alternately transparent and opaque but that other analogous forms of digital pattern may be impressed upon each provided the matching between the patterns on the tracks may be detected and measured. For example, a selectively reflective rotor and transparent stator could be used. It should also be clear that many of the features of the present invention including the frame size and biasing system as well as the method of selecting zero mark patterns could be used with a encoder system having a single rotor zero mark track and producing only a single transmissivity signal that is compared against a fixed reference signal. In order to apprise the public of the various embodiments that may fall within the scop of the invention, the following claims are made.

I claim:

1. A position encoder comprising:
   a stator mask having a stator track with a stator pattern having a plurality of opaque and transparent frames corresponding to an optimized binary aperiodic pattern wherein the optimized binary aperiodic pattern is produced by the steps of:
   (a) generating a current operand pattern from an input operand pattern, the current operand pattern having a plurality of frames with a predetermined density and a first zero mark discrimination;
   (b) identifying a next constant density neighbor pattern having a second zero mark discrimination better than the first zero mark discrimination;
   (c) repeating step (b) with the current operand made equal to the next constant density neighbor and the first zero mark discrimination made equal to the second zero mark discrimination;
   (d) repeating steps (b) and (c) until no next constant density neighbor with a second zero discrimination mark better than the first zero mark discrimiantion pattern is found; and
   (e) adopting the current operand pattern as the zero mark pattern;
   a rotor having a rotor track with a rotor pattern, the rotor positioned with respect to the stator mask so that the stator mask track is aligned with the rotor track during movement of the rotor, the rotor pattern being such that at a first position the rotor pattern matches the stator pattern; and
   a comparison means for detecting the degree to which the stator and rotor patterns match for producing a zero mark signal.

2. The position encoder of claim 1 wherein the stator pattern and rotor pattern are identical.

3. The position encoder of claim 1 wherein the stator pattern and rotor pattern are complementary.

4. A position encoder zero mark detector comprising:
   a stator mask having an inner and outer stator track, the inner and outer stator track having a corresponding inner and outer stator pattern that are non-identical and non-complementary;
   a rotor having a corresponding inner and outer rotor track with corresponding inner and outer rotor patterns and positioned to move past the stator mask so that the inner and outer rotor tracks are aligned with the corresponding inner and outer stator track;

a first signal means for detecting the degree of transmissivity of the inner stator pattern with the inner rotor pattern to produce a first transmissivity signal;

a second signal means for detecting the degree of transmissivity of the outer stator pattern with the outer rotor pattern to produce a second transmissivity signal; and a comparison means for comparing the first and second transmissivity signals to produce a zero position signal.

5. The encoder of claim 4 wherein:

one rotor pattern is complementary with its corresponding stator pattern to form the minimally transmissive sensor; and the stator pattern for the minimally transmissive sensor has been optimized first to increase its zero mark discrimination and second to increase its secondary maximum without decreasing its zero mark discrimination.

6. The encoder of claim 4 wherein:

one rotor pattern is identical to its corresponding stator pattern to form the maximally transmissive sensor; and the stator pattern for the maximally transmissive sensor has been optimized first to increase its zero mark discrimination and second to decrease its secondary maximum without decreasing its zero mark discrimination.

7. A method of producing a zero mark pattern for a position encoder comprising the steps of:

(a) generating a current operand pattern from an input operand pattern, the current operand pattern having a plurality of frames with a predetermined density and a first zero mark discrimination;

(b) identifying a next constant density neighbor pattern having a second zero mark discrimination better than the first zero mark discrimination;

(c) repeating step (b) with the current operand made equal to the next constant density neighbor and the first zero mark discrimination made equal to the second zero mark discrimination;

(d) repeating steps (b) and (c) until no next constant density neighbor with a second zero discrimination mark better than the first zero mark discrimination pattern is found; and (e) adopting the current operand pattern as the zero mark pattern.

8. The method of claim 7 wherein the input operand pattern has substantially equal transmissive and opaque areas.

9. The method of claim 7 wherein the input operand pattern is formed from a pseudorandom sequence.

10. A method of producing a zero mark pattern for a maximally transmissive sensor of a position encoder comprising the steps of:

(a) generating a current operand pattern from an input operand pattern, the current operand pattern having a first zero mark discrimination and a first secondary maximum;

(b) identifying a next variable density neighbor pattern having either a second zero mark discrimination better than the first zero mark discrimination, or having a second zero mark discrimination equal to the first zero mark discrimination and a second secondary maximum less than the first secondary maximum;

(c) repeating step (b) with the current operand made equal to the next variable density neighbor and the first zero mark discrimination and first secondary maximum made equal to those corresponding values of the next variable density neighbor;

(d) repeating steps (b) and (c) until no next variable density neighbor is found; and (e) adopting the current operand pattern as the zero mark pattern.

11. The method of claim 10 wherein the input operand pattern is produced by the method of claim 8.

12. A method of producing a zero mark pattern for the minimally transmissive sensor of a position encoder comprising the steps of:

(a) generating a current operand pattern from an input operand pattern, the current operand pattern having a first zero mark discrimination and a first secondary maximum;

(b) identifying a next variable density neighbor pattern having either a second mark discrimination better than the first zero mark discrimination, or having a second zero mark discrimination equal to the first zero mark discrimination and a second secondary maximum greater than the first secondary maximum;

(c) repeating step (b) with the current operand made equal to the next variable density neighbor and the first zero mark discrimination and first secondary maximum made equal to those corresponding values of the next variable density neighbor;

(d) repeating steps (b) and (c) until no next variable density neighbor is found; and (e) adopting the current operand pattern as the zero mark pattern.

13. The method of claim 12 wherein the input operand pattern is produced by the method of claim 8.

14. An incremental encoder generating two signals $R(100)$ and $e, ovs/R/ (\phi)$ indicating the transmissively through a first and second zero mark pattern and its associated mask wherein the first signal is at a primary maximum value "n" at a first encoder position and the second signal is at a primary minimum value "$(b_D+n'-n')$" at the first encoder position and wherein the first signal is at a secondary maximum value "m" different from the primary maximum value "n" at a second encoder position and the second signal is at a secondary minimum value "$(b_D+n'-m)$" different from the primary value "$(b_D+n'-n')$" at the second encoder position, comprising:

a comparision means for combining the first and second signals for creating a zero mark signal;

a bias means for biasing one signal to adjust the difference between the primary maximum value "n" and primary minimum value"$(b_D+n'-n')$" at the first encoder position with respect to the difference between the secondary maximum value "n" and the secondary minimum value"$(b_D+n'''m)$" at the second encoder position.

15. The position encoder of claim 14 wherein the bias is adjusted is to make the difference between the primary maximum value "n" and primary minimum value "$(b_D+n'-n')$" at the first encoder position less than or equal to the difference between the secondary maximum value "n" and the secondary minimum value"$(b_D+n'-m)$"]at the second encoder position.

16. The encoder of claim 14 including:
four quadrature sensors;
a summing means for summing the signals from the four quadrature increment sensors to produce a bias factor; and
wherein the bias is a function of the bias factor.

17. An incremental encoder comprising:
a first signal means for generating a signal indicating the transmissivity through a zero mark pattern having a first frame size and producing a zero mark reference;
a second signal means for generating a signal indicating a zero region and a non-zero region and having a second frame size wherein the ratio of the first frame size to the second frame size is adjusted to maximize the transmissivity in the zero region and to minimize the transmissivity in the non-zero region, and
a logic means for producing a zero mark signal from the logical AND of the zero mark reference signal and the increment signal.

18. The incremental encoder of claim 17 wherein the ratio of the first frame size to the second frame size is 3 to 2.

* * * * *

UNITED STATES PATENT AND TRADEMARK OFFICE
CERTIFICATE OF CORRECTION

PATENT NO. : 5,065,017

DATED : November 12, 1991

INVENTOR(S) : Robert W. Hoech

It is certified that error appears in the above-identified patent and that said Letters Patent is hereby corrected as shown below:

```
In the abstract
"resoltuion" should

--resolution--

Col. 1, Line 56
"("stator mask ≲ )"
should be
--("stator mask")--

Col. 2, Line 4
"Alternatively"
should
begin the next paragraph

Col. 2, Line 21
"nonzero" should be
--non-zero--

Col. 3, Line 59-60
"noncomplementary"
should be
non-complementary

Col. 4, Line 7
"steel - ball"
should be --steel
ball--
```

UNITED STATES PATENT AND TRADEMARK OFFICE
CERTIFICATE OF CORRECTION

PATENT NO. : 5,065,017

DATED : November 12, 1991

INVENTOR(S) : Robert W. Hoech

It is certified that error appears in the above-identified patent and that said Letters Patent is hereby corrected as shown below:

Col. 4, Line 30
MISSING after the words receiving array are: "of photodiodes 22 through the rotor 16 so that light from the"

Col. 4, Line 68
Insert 10 after the word "shaft"

Col. 5, Line 66
Insert "stator pattern 72 is the complement to the state of the" after "of" (2nd occurrence)

Col. 6, Line 19
Insert a space after word "true"

Col. 6, Line 39
Delete R($\phi$) after the word "which"

UNITED STATES PATENT AND TRADEMARK OFFICE
CERTIFICATE OF CORRECTION

PATENT NO. : 5,065,017

DATED : November 12, 1991

INVENTOR(S) : Robert W. Hoech

It is certified that error appears in the above-identified patent and that said Letters Patent is hereby corrected as shown below:

Col. 6, Line 55
"vauue" should be
--value--

Col. 6, Line 57
"$\phi = \ = 0$" should be
--$\phi = \Phi = 0$--

Col. 6, Line 64
"31 L>$\phi$>L, "
should be -- $-L > \Phi > L,$ --

Col. 6, Line 68
"$3A > \Phi\ 22 - 3A$"
should be
-- $3A > \phi > -3A$ --

Col. 7, Line 9
(2)
"$e,ovs/R/(\Phi) = (n^1 - r^1(\Phi)) + b_D$"
should be
-- $\bar{R}(\Phi) = (R' - r'(\Phi)) + b_D$ --

UNITED STATES PATENT AND TRADEMARK OFFICE
CERTIFICATE OF CORRECTION

PATENT NO. : 5,065,017

DATED : November 12, 1991

INVENTOR(S) : Robert W. Hoech

It is certified that error appears in the above-identified patent and that said Letters Patent is hereby corrected as shown below:

Col. 7, Line 28
"tne" should be
--the--

Col. 7, Line 35
"$n' + ]b_D$" should be
"$n' + b_D$"

Col. 9, Line 24
Delete "stator pattern 72 is the complement to the state of the"

Col. 9, Line 35
"patter" should be
--pattern--

Col. 10, Line 18
"$e,ovs/R/(\phi)$" should be
-- $\overline{R}(\phi)$ --

Col. 10, Line 24
"tne" should be
--the--

UNITED STATES PATENT AND TRADEMARK OFFICE
CERTIFICATE OF CORRECTION

PATENT NO. : 5,065,017

DATED : November 12, 1991

INVENTOR(S) : Robert W. Hoech

It is certified that error appears in the above-identified patent and that said Letters Patent is hereby corrected as shown below:

Col. 10, Line 28
"$R(\phi) - R(100)$"
should be
--$R(\phi) - R(\phi)$--

Col. 10, Line 45
The letter "a" after
60 should be --as--

Col. 10, Line 60
"th" should be --the--

Col. 10, Line 65
"$R(100)$" should be
--$R(\phi)$--

Col. 10, Line 66
"$R'(100)$" should be
--$R'(\phi)$--

Col. 12, Line 21
"scop" should be
--scope--

Col. 12, Line 46

UNITED STATES PATENT AND TRADEMARK OFFICE
CERTIFICATE OF CORRECTION

PATENT NO. : 5,065,017  Page 6 of 7

DATED : November 12, 1991

INVENTOR(S) : Robert W. Hoech

It is certified that error appears in the above-identified patent and that said Letters Patent is hereby corrected as shown below:

"discrimiantion"
should be --
discrimination--

Col. 14, Line 41
"R(100)" should be
--R($\phi$)--

Col. 14, Line 41
"e,ovs/R/($\phi$)" should
be
--$\overline{R}$($\phi$)--

Col. 14, Line 41
"transmissively"
should be
"transmissivity--

Col. 14, Line 50
Insert a parentheses
after the 1st set of
quotation marks

Col. 14, Line 57
Change the 1st set of
quotation marks to
the opposite
direction

UNITED STATES PATENT AND TRADEMARK OFFICE
CERTIFICATE OF CORRECTION

PATENT NO. : 5,065,017

DATED : November 12, 1991

INVENTOR(S) : Robert W. Hoech

It is certified that error appears in the above-identified patent and that said Letters Patent is hereby corrected as shown below:

Col. 14, Line 60
"$(b_D + n''`m)$" should be
--$(b_D + n' - m)$"--

Col. 14, Line 68
Delete the bracket

Col. 16, Line 10
"wherein" should be
--where--

Signed and Sealed this

Twenty-second Day of June, 1993

Attest:

MICHAEL K. KIRK

*Attesting Officer*     Acting Commissioner of Patents and Trademarks